9/20/83 XR 4,405,676

United States Patent [19]

Pohl

[11] 4,405,676

[45] Sep. 20, 1983

[54] DECORATIVE RIBBON OR SHEET MATERIAL

[75] Inventor: Daniel P. Pohl, Grant, Minn.

[73] Assignee: Minnesota Mining & Manufacturing Company, St. Paul, Minn.

[21] Appl. No.: 263,048

[22] Filed: May 13, 1981

[51] Int. Cl.[3] .......... B32B 3/00

[52] U.S. Cl. .......... 428/164; 350/164; 350/167; 428/167; 428/172

[58] Field of Search .......... 428/164, 913, 29, 30, 428/167, 172; 350/167, 164

[56] References Cited

U.S. PATENT DOCUMENTS

| | | | |
|---|---|---|---|
| 1,805,224 | 5/1931 | Oestnaes . | |
| 2,510,344 | 6/1950 | Law | 350/167 |
| 2,626,883 | 1/1953 | Boese | 154/53.6 |
| 2,882,631 | 4/1959 | Boone | 428/167 |
| 2,951,419 | 9/1960 | Lemelson | 88/82 |
| 3,264,164 | 8/1966 | Jerothe et al. | 350/167 |
| 3,353,897 | 11/1967 | Lemelson | 350/167 |
| 3,357,772 | 12/1967 | Rowland | 350/167 |
| 3,357,773 | 12/1967 | Rowland | 350/167 |
| 3,400,036 | 9/1968 | Hemrick | 350/164 |
| 3,417,959 | 12/1968 | Schultz | 249/117 |
| 3,449,158 | 6/1969 | Rowland | 156/209 |
| 3,481,663 | 12/1969 | Greenstein | 428/167 |
| 3,576,689 | 4/1971 | Vraushihara | 428/167 |
| 3,636,147 | 1/1972 | Rowland | 264/1 |
| 3,661,686 | 5/1972 | Armstrong | 428/164 |
| 3,716,445 | 2/1973 | Lemelson | 161/2 |
| 3,726,079 | 4/1973 | Field et al. | 428/167 |
| 3,751,550 | 9/1973 | Nauta | 264/275 |
| 3,832,541 | 8/1974 | Bassett et al. | 240/106 R |
| 3,839,514 | 10/1974 | Nauta | 264/1 |
| 3,935,359 | 1/1976 | Rowland | 428/172 |
| 4,025,674 | 5/1977 | Mizouchi | 428/29 |
| 4,138,515 | 2/1979 | Dial | 428/30 |
| 4,264,664 | 4/1981 | Kunz | 428/164 |

*Primary Examiner*—William R. Dixon, Jr.
*Attorney, Agent, or Firm*—Cruzan Alexander; Donald M. Sell; Robert W. Sprague

[57] ABSTRACT

The present invention provides economical decorative ribbon or sheet material exhibiting desirable aesthetic qualities.

9 Claims, 2 Drawing Figures

DECORATIVE RIBBON OR SHEET MATERIAL

BACKGROUND OF THE PRESENT INVENTION

The present invention relates to decorative ribbon or sheet material.

The three primary types of decorative ribbon in widespread use today are woven yarn-based ribbons, nonwoven yarn-based ribbons, and foamed-oriented polypropylene-based ribbons.

The yarn-based ribbons are generally the finest in quality in terms of yarn-like luster, texture, feel, quality of color, and other often subjective qualities. Unfortunately, such ribbons are relatively expensive to manufacture. The polypropylene-based ribbons while being of lesser cost do not generally offer aesthetics equivalent to that of yarn-based ribbons.

While the aesthetics of a decorative ribbon are often a subjective matter, the aesthetics can be described to a certain extent through a description of the reflective properties of the ribbon.

Diffuse reflection scatters the light in all directions with no one direction having significantly more light reflected towards it than another direction. A piece of paper is an example of a diffuse reflector.

Specular reflection is the type which is obtained off of a smooth mirror-like surface. When light strikes its surface it is reflected to an equal, but opposite angle from that of the incident beam. Light is returned to the source only when the light beam is exactly perpendicular to the surface.

Retro or reflex reflecting materials return incoming light directly to the source. This type of material is commonly used in traffic signs and license plates.

Decorative ribbons preferably exhibit little or no retroreflection. Furthermore, such ribbons preferably exhibit a certain balance of diffuse and specular reflection.

Yarn-based ribbons generally exhibit little retroreflection and exhibit a desirable balancing of diffuse and specular reflection. On the other hand, foamed-oriented polypropylene-based ribbons generally exhibit a greater amount of specular reflection and a lesser amount of diffuse reflection than the yarn-based ribbons.

Furthermore, the colors of foamed-oriented polypropylene ribbon are often diminished because of the foaming process used for producing their cellular structure. The resultant colors, especially the darker colors, often have a washed-out colored appearance.

SUMMARY OF THE PRESENT INVENTION

The present invention provides decorative ribbon or sheet material which, through inclusion of a plastic film having a substantially regular convex lens embossed on a first surface and a light diffusing embossment on the second surface, and through inclusion of a colored reflective coat or coats adhered to the second surface of the plastic film, exhibit aesthetic improvements over foamed-oriented polypropylene-based ribbons. In particular, the decorative ribbon or sheet material of the present invention represents an improvement over the foamed-oriented polypropylene-based ribbons in terms of intensity of color and in terms of the balance of specular and diffuse reflection.

DETAILED DESCRIPTION OF THE INVENTION

The invention is described in more detail hereinafter with reference to the accompanying drawings wherein like reference characters refer to the same parts throughout the several views and in which.

Figure 1:
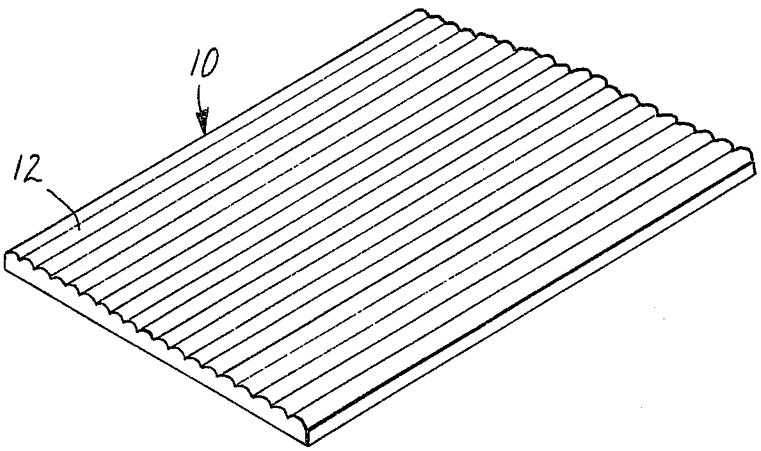
FIG. 1 is a perspective view of one embodiment of the present invention.

Thus, in FIG. 1 there is shown a strip of decorative sheet material 10 embossed on the top surface thereof.

Figure 2:
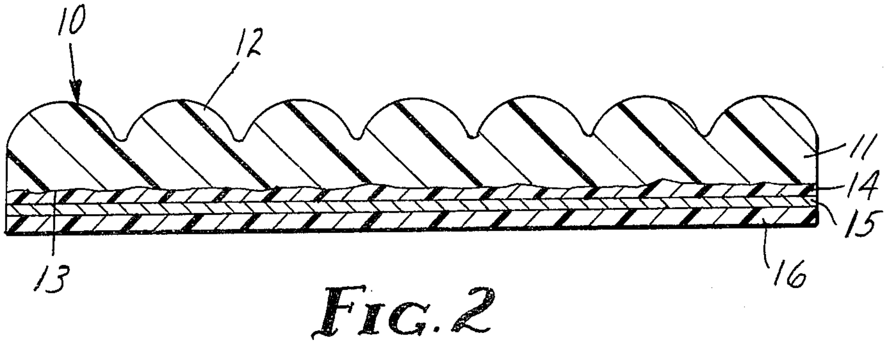
FIG. 2 is a cross-sectional view of the embodiment of FIG. 1.

Referring now to FIG. 2, the construction of decorative sheet material 10 can be more easily understood. Decorative sheet material 10 comprises plastic film 11 which has been embossed in a first pattern on the top surface 12 of plastic film 11 and in a second pattern on the bottom surface 13 of plastic film 11. The first pattern is a substantially regular convex cylindrical lens configuration and the second pattern is a pattern which is capable of diffusing light. Coat 14 is a transparent color coat which is adhered to the bottom surface of plastic film 11. Also shown is reflective coat 15 which is adhered to the bottom surface of coat 14. Finally, coat 16 which is also a color coat is adhered to the bottom surface of reflective coat 15.

Plastic film 11 is preferably transparent and preferably comprises a thermoplastic resin which permits the film to be formed through an unoriented extrusion process. As is discussed below, plastic film 11 is preferably embossed during the extrusion process itself. Suitable plastic films are those which, subsequent to embossing, are about 2 to 10 mils in thickness. Preferred plastic films 11 are about 4 to 6 mils in thickness.

Suitable resins for preparing plastic film 11 include polyester and polyolefin resins. A specific example of a suitable polyester resin is that available under the trade designation "PETG" (a copoly(1,4-cyclohexylene dimethylene/ethylene)terephthalate resin, commercially available from Eastman Chemical Company). A specific example of a suitable polyolefin is polypropylene.

Plastic film 11, as mentioned above, is preferably embossed during the extrusion process. More particularly, plastic film 11 is preferably embossed by employing patterned quench rollers. The top embossment is provided through employment of a patterned quench roller which has been manufactured by conventional mechanical means. The bottom embossment is provided through employment of a rubber-coated quench roller having a surface finish which has been rendered irregular, for example, through sandblasting.

The convex cylindrical lens elements of the top embossment of plastic film 11 should have a radius of curvature of about 1 to 5 mils, and preferably about 2 to 3 mils. To achieve suitable optical properties, it is preferred that the thickness of plastic film 11 be approximately twice the radius of curvature of the lens elements. A lens element having a radius of curvature of about 2.9 mils has been found to be particularly suitable in combination with a plastic film 11 of about 5 mils in thickness. It is to be understood that the lens elements need not be convex cylindrical in configuration. Other convex configurations for the lens element are within the scope of the present invention so long as they provide decorative sheet material exhibiting the desired optical properties.

Coat 14 comprises a dye contained in a suitable organic binder. Coat 14 is employed in order to contribute to the desired color of decorative sheet material 10. Additionally, coat 14 should be suitably transparent to permit sufficient transmission of light through it. It is desirable to employ as thin a coating of coat 14 as is possible while still allowing for the desired color intensity.

Suitable organic resin binders for employment in color coat 14 include solvent-soluble polyester resins (e.g., that commercially available under the trade designation "Vitel PE 222" from Goodyear Company). The preferred organic binders are vinyl chloride-vinyl acetate copolymers. In particular, the vinyl chloride (86%)/vinyl acetate (14%) copolymer which is commercially available under the trade designation "VMCH Resin" from Union Carbide Corporation is preferred in the practice of the present invention.

Suitable dyes for employment in coat 14 are well known in the art. Preferred dyes are those which are soluble in organic solvents. The type and amount of the dye or dyes selected for employment in coat 14 depend on the particular color desired in decorative sheet material 10. Specific examples of suitable dyes are those available under the trade designations "Genacryl Red 4B" (commercially available from GAF Corporation), "Calcozine Acrylic Red 4GB" (commercially available from American Cyanamid), "Red Amaplast Scarlet" (commercially available from American Color and Chemical Company).

It is also desirable to employ a plasticizer in coat 14. A preferred plasticizer is dioctyl phthalate. A particularly suitable amount of the plasticizer is 22 parts by weight per 55 parts by weight of the organic resin binder.

It is preferred that coat 14 be employed in an amount of about 0.2 grams per square foot.

Reflective coat 15 may comprise a metallic powder dispersed in an organic binder. Alternatively, reflective coat 15 may comprise a metallic vapor coat. Reflective coat 15 is provided in order to increase the reflectance of the decorative sheet material 10.

In the event that reflective coat 15 comprises a dispersion of metal powder in an organic resin binder, the organic resin binder may be one of those described above in connection with coat 14. The above-mentioned "VMCH Resin" is the preferred organic resin binder for reflective coat 15.

Suitable metallic powders should contain particles having an average diameter of between about 5 to 25 microns and preferably between about 5 to 50 microns. A preferred metallic powder is the aluminum powder commercially available under the trade designation "Aluminum Fine #3" from Atlantic Metal Powders. This particular powder contains particles having an average diameter of about 15 microns. A preferred amount of the metallic powder is 6.25 parts by weight per 55 parts by weight of the organic resin binder. Depending on the color desired in decorative sheet material 10, the metal powder may also be a bronze powder.

A preferred reflective coat 15 also comprises a plasticizer. In particular a preferred reflective coating comprises, in addition to the dye, 22 parts by weight of the above-mentioned plasticizer dioctyl phthalate per 55 parts by weight of "VMCH Resin."

Reflective coat 15 is preferably employed in an amount of about 0.2 grams per square foot.

As mentioned above, reflective coat 15 may also be a conventional metallic vapor coat (e.g., a vapor coat of aluminum).

Coat 16 comprises a dye and/or pigment contained in a suitable organic binder. Coat 16 is employed in order to contribute to the desired color of decorative sheet material 10 and may be employed to coordinate the color of the bottom surface of the decorative sheet material with that of the top surface.

Suitable organic resin binders for employment in coat 16 include those discussed above in connection with coat 14.

Suitable dyes and pigments for employment in coat 16 are well known to those skilled in the art.

A preferred coat 16 also comprises a plasticizer. In particular, a preferred coat 16 comprises, in addition to the dye and/or pigment, 22 parts by weight of dioctyl phthalate per 55 parts by weight of "VMCH Resin."

Additionally it has been found to be desirable to employ an anti-blocking agent in coat 16. This facilitates unwinding of the decorative sheet material from a roll. A preferred wax-type anti-blocking agent is that available under the trade designation "Slip Quick" from Hexcel Corporation. A preferred amount of the anti-blocking agent is 3% by weight of the organic resin binder.

Coat 16 is preferably employed in an amount of 0.2 grams per square foot.

The above-discussed embodiment is particularly suitable for producing decorative sheet material exhibiting dark colors.

In another embodiment which is particularly suitable as white or pastel-colored decorative sheet material, the decorative sheet material of the present invention may comprise a plastic film which has embossed as discussed above and which contains pearlescent pigment dispersed therein (during the extrusion process).

Suitable pearlescent pigments are well-known to those skilled in the art. A particularly suitable pearlescent pigment for white or pastel-colored decorative sheet material is the titanated-mica commercially available under the trade designation "Afflair 101" from EM Laboratories. A preferred amount of the pearlescent pigment is 0.8% by weight of the resin which is employed to prepare plastic film.

It has been found desirable to employ an additional color coat on the bottom surface of the pearlescent pigment-containing plastic film. In particular, it has been found desirable to employ a transparent color coat adjacent to the bottom surface of the plastic film, that color coat being analogous to coat 14 of FIG. 2 above. A preferred amount of this color coat is 0.2 grams per square foot.

Also, in order to increase the reflectance and opacity of the decorative sheet material, it has been found to be desirable to employ a reflective coat, which is similar to reflective coat 15 of FIG. 2 above except that here an inorganic pigment has been substituted for the metallic powder of reflective coat 15. Suitable inorganic pigments include barium sulfate, zinc oxide and calcium oxide. A preferred inorganic pigment is titanium dioxide (e.g., that commercially available from New Jersey Zinc Company). A preferred amount of the inorganic pigment is 23 parts by weight per 55 parts by weight of the organic resin binder. It is also desirable to include an antiblocking agent such as the above-mentioned "Slip Quick" in an amount of 3% by weight of the organic resin binder. A preferred amount of this reflective coat is 0.4 grams per square foot.

In yet another embodiment, the decorative sheet material of the present invention comprises a plastic film which has been embossed as discussed above and a reflective coat which is adhered to the bottom surface of the plastic film. The reflective coat comprises a pearlescent pigment dispersed in an organic resin binder.

In general, the coats of the decorative sheet material of the present invention are applied to the plastic film or to an adjacent coat using conventional coating or printing techniques. The coats are applied from a suitable organic solvent system. A preferred solvent system containing a 50:50 (weight/weight) mixture of acetone and ethyl acetate.

What is claimed is:

1. A decorative sheet material comprising:
(a) a plastic film embossed over substantially its entire top surface in a first pattern and over substantially its entire bottom surface in a second pattern, said first pattern being a substantially regular parallel convex cylindrical lens configuration wherein the radius of curvature of the convex cylindrical lens is about one-half the thickness of said plastic film, and said second pattern being of a type which is capable of diffusing light;
(b) a first color coat adhered to said bottom surface of said plastic film;
(c) a reflective coat adhered to the underside of said first color coat, said reflective coat comprising a metallic powder dispersed in an organic resin binder; and
(d) a second color coat adhered to the underside of said reflective coat.

2. A decorative sheet material in accordance with claim 1, wherein said metallic powder comprises particles having an average diameter of between about 5 and 50 microns.

3. A decorative sheet material in accordance with claim 1, wherein said plastic film is a polyester.

4. A decorative sheet material in accordance with claim 1, wherein said first color coat and said second color coat each comprise independently (a) an organic resin binder selected from the group consisting of a polyester resin; and a vinylchloride-vinyl acetate copolymer and (b) a plasticizer.

5. A decorative sheet material comprising:
(a) a plastic film embossed over substantially its entire top surface in a first pattern and over substantially its entire bottom surface in a second pattern, said first pattern being a substantially regular, parallel convex cylindrical lens configuration wherein the radius of curvature of the convex cylindrical lens is about one-half the thickness of said plastic film, and said second pattern being of a type which is capable of diffusing light;
(b) a first color coat adhered to said bottom surface of said plastic film;
(c) a reflective coat adhered to the underside of said first color coat, said reflective coat comprising a metallic vapor coat; and
(d) a second color coat adhered to the underside of said reflective coat.

6. A decorative sheet material in accordance with claim 5, wherein said plastic film is a polyester.

7. A decorative sheet material comprising:
(a) a plastic film embossed over substantially its entire top surface in a first pattern and over substantially its entire bottom surface in a second pattern, said first pattern being a substantially regular, parallel convex cylindrical lens configuration wherein the radius of curvature of the convex cylindrical lens is about one-half the thickness of said plastic film, and said second pattern being of a type which is capable of diffusing light, said plastic film including a pearlescent pigment dispersed therein;
(b) a first color coat adhered to said bottom surface of said plastic film; and
(c) a reflective coat adhered to the underside of said first color coat, said reflective coat comprising an inorganic pigment dispersed in an organic resin binder.

8. A decorative sheet material in accordance with claim 7, wherein said plastic film is a polyester.

9. A decorative sheet material comprising:
(a) a plastic film embossed over substantially its entire top surface in a first pattern and over substantially its entire bottom surface in a second pattern, said first pattern being a substantially regular, parallel convex cylindrical lens configuration wherein the radius of curvature of the convex cylindrical lens is about one-half the thickness of said plastic film, and said second pattern being of a type which is capable of diffusing light; and
(b) a reflective coat adhered to the bottom surface of said plastic film, said reflective coat comprising a pearlescent pigment dispersed in an organic resin binder.

* * * * *